(12) United States Patent
Cao et al.

(10) Patent No.: US 9,838,930 B2
(45) Date of Patent: Dec. 5, 2017

(54) METHOD AND APPARATUS FOR TRANSMITTING AN AUXILIARY CELL IDENTITY

(71) Applicants: ZTE WISTRON TELECOM AB, Kista (SE); ZTE (TX) INC., Austin, TX (US)

(72) Inventors: Aijun Cao, Kista (SE); Thorsten Schier, Kista (SE); Yonghong Gao, Kista (SE); Jan Johansson, Kista (SE); Patrick Svedman, Kista (SE); Bojidar Hadjiski, Kista (SE)

(73) Assignee: ZTE WISTRON TELECOM AB, Kista (SE)

( * ) Notice: Subject to any disclaimer, the term of this patent is extended or adjusted under 35 U.S.C. 154(b) by 0 days.

(21) Appl. No.: 14/906,227

(22) PCT Filed: Jul. 17, 2014

(86) PCT No.: PCT/US2014/047030
§ 371 (c)(1),
(2) Date: Jan. 19, 2016

(87) PCT Pub. No.: WO2015/013103
PCT Pub. Date: Jan. 29, 2015

(65) Prior Publication Data
US 2016/0192264 A1  Jun. 30, 2016

Related U.S. Application Data

(60) Provisional application No. 61/857,454, filed on Jul. 23, 2013.

(51) Int. Cl.
*H04W 4/00* (2009.01)
*H04W 36/18* (2009.01)
(Continued)

(52) U.S. Cl.
CPC .............. *H04W 36/18* (2013.01); *H04W 4/00* (2013.01); *H04W 8/005* (2013.01);
(Continued)

(58) Field of Classification Search
CPC ....... H04W 36/18; H04W 4/00; H04W 8/005; H04W 36/165; H04W 72/0446;
(Continued)

(56) References Cited

U.S. PATENT DOCUMENTS

2012/0120891 A1* 5/2012 Mazzarese .......... H04W 72/042
  370/329
2015/0245308 A1* 8/2015 Lorca Hernando
  .......................... H04W 56/0015
  370/209

(Continued)

*Primary Examiner* — Barry Taylor
(74) *Attorney, Agent, or Firm* — Duane Morris LLP (57) ABSTRACT

An auxiliary cell identity (ACI) is proposed besides the conventional physical cell identity carried on the synchronization channels. The ACI is designed and configured to be transmitted in one or more primary regions and one or more secondary regions and transmitted by a base station/cell to a plurality of user equipment (UEs) located within coverage of the cell in one or more transmissions. Each of the UEs is configured to detects the transmitted ACI and identifies the cell based on the detected ACI.

36 Claims, 4 Drawing Sheets

(51) Int. Cl.
*H04W 8/00* (2009.01)
*H04W 36/16* (2009.01)
H04W 72/04 (2009.01)
H04J 11/00 (2006.01)
H04L 7/08 (2006.01)
H04B 7/26 (2006.01)

(52) U.S. Cl.
CPC ......... *H04W 36/165* (2013.01); *H04B 7/2656* (2013.01); *H04J 11/0073* (2013.01); *H04J 11/0076* (2013.01); *H04L 7/08* (2013.01); *H04W 72/0446* (2013.01)

(58) Field of Classification Search
CPC ..... H04J 11/0073; H04J 11/0076; H04L 7/08; H04B 7/2656
See application file for complete search history.

(56) References Cited

U.S. PATENT DOCUMENTS

2015/0312026 A1* 10/2015 Kim ................... H04W 56/00
370/338
2016/0066291 A1* 3/2016 Awad .................. H04B 7/2656
370/350

\* cited by examiner

METHOD AND APPARATUS FOR TRANSMITTING AN AUXILIARY CELL IDENTITY

RELATED PATENT APPLICATIONS

This application is a 371 National Phase Application from International Application No. PCT/US2014/047030, which was filed on Jul. 17, 2014 and claims the benefit of priority under 35 U.S.C. §119(e) to U.S. Provisional Application No. 61/857,454, entitled "Method for transmitting an auxiliary cell identity," filed Jul. 23, 2013, which is incorporated by reference herein in its entirety.

FIELD OF THE INVENTION

The present invention relates generally to cellular telecommunication systems, and in particular to a densely deployed network containing many small cells.

BACKGROUND OF THE INVENTION

Today's cellular communication systems provide not only voice services, but also mobile broadband services all over the world. As the number of applications for cell phones and other wireless devices continues to increase, and consume higher ever-increasing amounts of data, an enormous demand for mobile broadband data services is generated. This requires telecom operators to improve data throughput and maximize the efficient utilization of limited resources.

In response to the fact that the spectrum efficiency for the point-to-point link is already approaching its theoretical limit, the telecom industry has introduced the concept of a multi-layered network in order to fulfil the growing demands for mobile broadband data services. Generally, a multi-layered network consists of several layers of base stations that provide or enable different physical resources such as frequency bandwidth, transmit power, etc. to provide broadband data services. A heterogeneous network is one example of a typical two-layered network where a macro layer consisting of high transmit power base stations is complemented with another low transmit power node (LPN) layer using at least one common carrier. Another example of a heterogeneous network is when a macro layer is complemented with another layer of low transmit power nodes that provide communications using a different frequency carrier than the macro layer nodes.

There are many challenges to achieving a working multi-layer network and integrating the multiple layers of the network. For a non-limiting example, one consequence of deploying a multi-layered network is that the density of the sites is much higher than otherwise required. Some significant challenges are addressing the current physical cell identity (PCI) conflict or confusion and enabling efficient operation among different layers by developing more efficient cell discovery mechanisms, etc. In the non-limiting example of a highly dense multi-layered network, the current mechanism operates extremely inefficiently, both for inter-layer and intra-layer networks. One of the inefficiencies is caused by the power consumption of handsets.

In the non-limiting example of a cellular mobile network, a PCI is usually carried in the synchronization channels and it is used in many control messages related to the mobility management. For example, when a user equipment (UE) detects a better cell than the current one, it sends a measurement report containing the PCI of the detected cell. Due to its frequent use, a PCI is defined locally instead of globally in order to reduce its signaling overhead. Therefore, PCI is only distinguishable within a limited number of neighboring cells, and is the basis for Auto-Neighbor-Relationship (ANR) in a Self Organizing Network (SON). In a Long-Term Evolution (LTE) network, for example, PCI is denoted by the primary synchronization signal (PSS) index $\{0,1,2\}$ and the secondary synchronization signal (SSS) index $\{0, 1, \ldots, 167\}$. Thus, there are $3*168=504$ distinguishable PCIs in total. Since there are a limited number of PCI's, as the network becomes more dense, e.g., by adding more LPNs, there would be a situation in which a base station has neighboring cells with duplicate PCI's. Thus, it is unable to determine the correct target cell for handover from the PCI included in the measurement reports from the UE. Although this can be solved by instructing the UE to report the corresponding global ID, this method not only consumes more signaling resources over the air, but also degrades the mobility performance.

SUMMARY OF THE INVENTION

One object of the invention is to actively avoid or decrease the above-described degradations and disadvantages. In one embodiment of the invention, an auxiliary cell identity is proposed besides the conventional physical cell identity carried on the synchronization channels (e.g., the primary and secondary synchronization channels). With the introduction of the auxiliary cell identity, not only can the conflict and confusion of the current physical cell identity be solved, but also inter-layer operations such as fast cell discovery can be completed more quickly and efficiently, thus improving the performance of the mobile network.

Further features and advantages of the present invention, as well as the structure and operation of various embodiments of the present invention, are described in detail below with reference to the accompanying drawings.

BRIEF DESCRIPTION OF THE DRAWINGS

The present invention, in accordance with one or more various embodiments, is described in detail with reference to the following Figures. The drawings are provided for purposes of illustration only and merely depict exemplary embodiments of the invention. These drawings are provided to facilitate the reader's understanding of the invention and should not be considered limiting of the breadth, scope, or applicability of the invention. It should be noted that for clarity and ease of illustration these drawings are not necessarily made to scale.

DETAILED DESCRIPTION OF EXEMPLARY EMBODIMENTS

The approach is illustrated by way of example and not by way of limitation in the figures of the accompanying drawings in which like references indicate similar elements. It should be noted that references to "an" or "one" or "some"

embodiment(s) in this disclosure are not necessarily to the same embodiment, and such references mean at least one.

In the following description of exemplary embodiments, reference is made to the accompanying drawings which form a part hereof, and in which it is shown by way of illustration of specific embodiments in which the invention may be practiced. It is to be understood that other embodiments may be utilized and structural changes may be made without departing from the scope of the preferred embodiments of the invention.

The present invention is directed toward systems and methods for a cellular or mobile communication system. Embodiments of the invention are described herein in the context of an LTE network. The invention, however, is not limited to only LTE networks, and the methods described herein can also be utilized in other applications such as mobile-to-mobile communications, wireless local loop communications, wireless relay communications, or wireless backhaul communications, for non-limiting examples.

Figure 1:
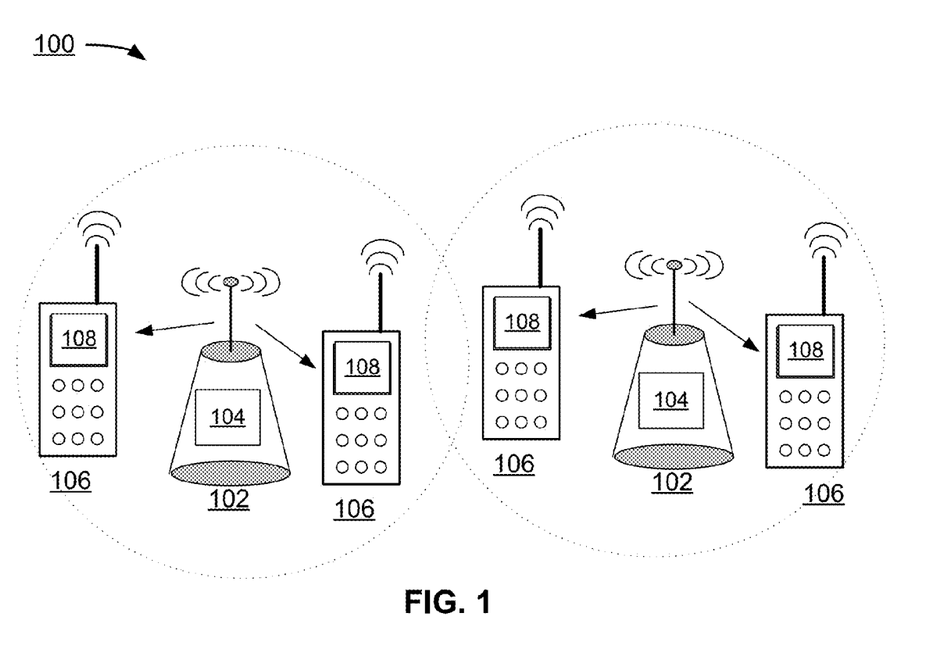
FIG. 1 depicts an example of a system to support auxiliary cell identity transmission and detection in a mobile communication network.

FIG. 1 depicts an example of a system 100 to support auxiliary cell identity transmission and detection in a mobile communication network. Although the diagrams depict components as functionally separate, such depiction is merely for illustrative purposes. It will be apparent that the components portrayed in this figure can be arbitrarily combined or divided into separate software, firmware and/or hardware components.

In the example of FIG. 1, system 100 includes at least one base station (also referred to herein as a "cell") 102 each having an auxiliary cell identity (ACI) unit 104. A plurality of mobile or user equipment (UEs) 106 connect to the base station 102 within the coverage of the cell 102, wherein each UE 106 includes an ACI detector 108. As referred to hereinafter, each base station 102 can be but is not limited to a macro base station, a high transmit power base station, a low transmit power node (LPN), or any other types of the base station operable to transmit its cell identity to a UE 106 in a multi-layered network for identification and connection. Each UE 106 can be but is not limited to one of a mobile computing, storage, or communication device, such as a laptop PC, a tablet PC, an iPod, an iPhone, an iPad, a Google Android device, a portable storage device, or a cell phone.

As referred to hereinafter, the terms "unit" and "detector" each includes hardware, firmware, or software and corresponding processor(s) for executing the software, or any combination of one or more of these components used to effectuate a purpose. As a non-limiting example, the software instructions are stored in non-volatile memory (also referred to as secondary memory). When the software instructions are executed, at least a subset of the software instructions is loaded into memory (also referred to as primary memory) by a computing unit. When the software instructions are executed, at least a subset of the software instructions is loaded into memory, and the computing unit becomes a special purpose computing unit for practicing the processes. When implemented on a general-purpose computing unit, the computer program code segments configure the computing unit to create specific logic circuits. The processes may alternatively be at least partially embodied in a digital signal processor formed of application specific integrated circuits (ASIC) for performing the processes.

In the example of FIG. 1, the ACI unit 104 of the cell 102 is configured to transmit an auxiliary cell identity (ACI) to a plurality of UEs 106 within the coverage of the cell 102 in one or more transmissions. Here, the ACI can be used either as an independent cell identity by itself or as a supplemental cell identity transmitted together with a physical cell identity (PCI) of the cell 102 for identification of the cell 102 by the ACI detector 108 of a UE 106. In some embodiments, the ACI unit 104 of the cell 102 is configured to design, configure, and transmit the ACI in two kinds of regions during each ACI transmission: a primary region and a secondary region. The resources for carrying the two kinds of regions are predefined and there can be $N_p$ primary regions and $N_s$ secondary regions respectively for the ACI transmissions.

Figure 2:
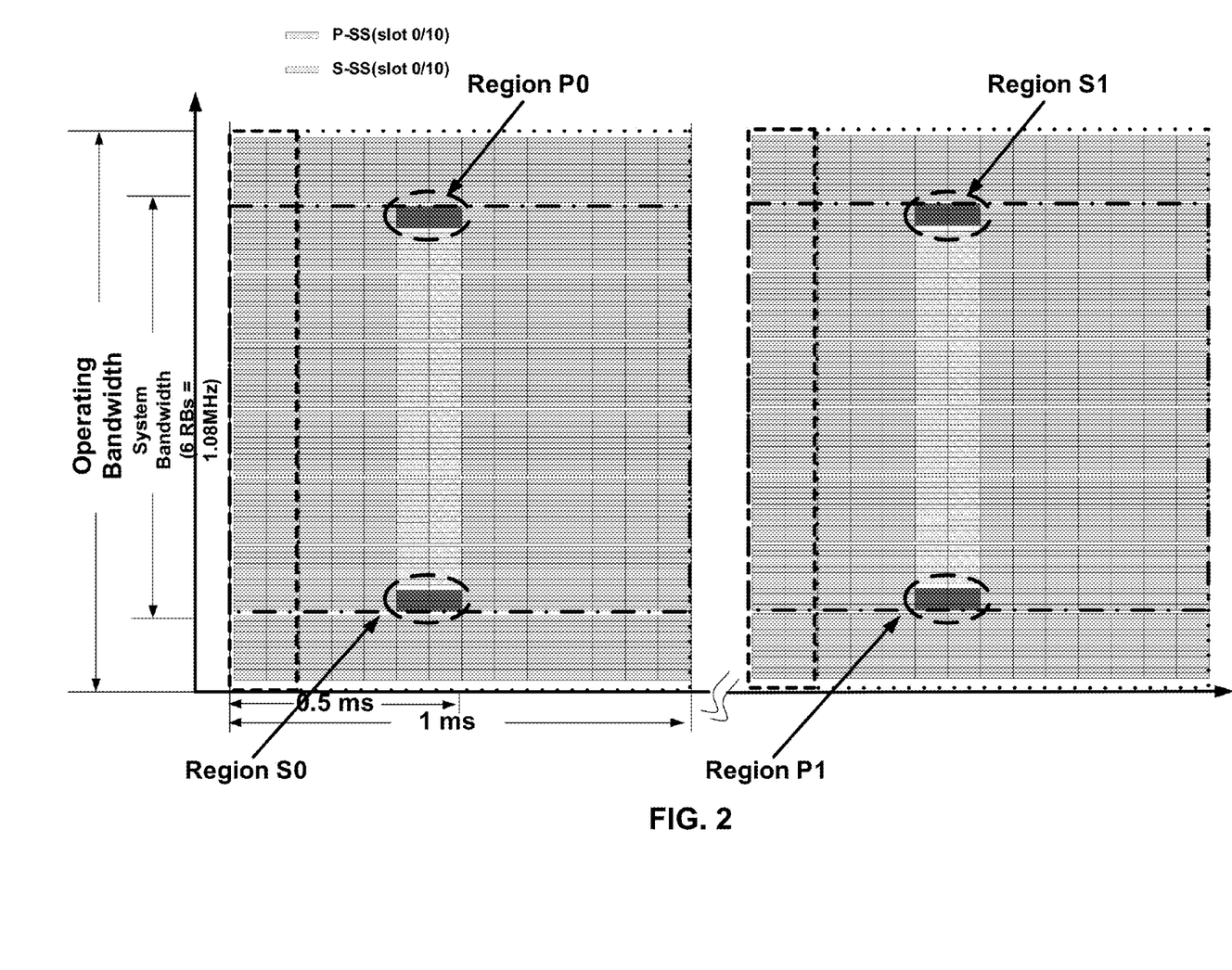
FIG. 2 depicts an example of ACI transmission in an LTE network.

In some embodiments, when only one primary region and one secondary region are present, the ACI unit 104 of the cell 102 is configured to map the two regions into unused resource elements (REs) besides the primary and secondary synchronization symbols/channels in LTE during transmission of the ACI as shown by the example of ACI transmission in an LTE network depicted in FIG. 2. In the example depicted in FIG. 2, the ACI unit 104 of the cell 102 is configured to transmit the ACI twice in one radio frame, wherein the first ACI transmission is via primary region P0 and secondary region S0, and the second transmission is via primary region P1 and secondary region S1, respectively. As shown in the example depicted in FIG. 2, the primary region P0 is mapped to the unused REs besides the upper end of PSS and SSS in slot 0, and the secondary region S0 is mapped to the unused REs besides the lower end of PSS and $SSS_0$ in slot 0. In addition, the primary region P1 is mapped to the unused REs besides the lower end of PSS and $SSS_1$ in slot 10, and the secondary region S1 is mapped to the unused REs beside the upper end of PSS and $SSS_1$ in slot 10.

As referred to hereinafter, a (radio) frame provides the main structure that governs how quickly the ACI unit 104 of the cell 102 can acquire synchronization within a specified frame boundary and begin transmitting the ACI. A frame is primarily characterized by a length, a presence of a synchronization signal, which typically carries known sequences located at a fixed predefined position in the frame, and control information that pertains to the frame. A frame can be further divided into several so-called sub-frames, which enables one frame to be shared among different users in the time domain.

In some embodiments, the ACI unit 104 of the cell 102 is configured to adjust/change the configurations and definitions of the primary regions and/or the secondary regions dynamically, e.g., by re-defining or re-configuring a sub-region to be a sub-primary region or a sub-secondary region according to the needs during operation, etc. The ACI unit 104 performs such changes to the configurations of the regions prior to the transmissions of the ACI.

In some embodiments, the ACI unit 104 of the cell 102 is configured to define a set of base sequences including a plurality of $M_{pi}$ orthogonal sequences of length $N_{pi}$ for each primary region Pi with index m from 0, 1, . . . , to $M_{pi-1}$: $A^{pi}_m(n)$ where n=0, 1, . . . , $N_{pi-1}$, and Pi=0, 1, . . . , $N_p-1$. In addition, the ACI unit 104 of the cell 102 is configured to further define a set of base sequences including a plurality of $M_{si}$ orthogonal sequences of length $N_{si}$ for each secondary region Si with index m from 0, 1, . . . , to $M_{si}-1$: $A^{si}_m(n)$ where n=0, 1, . . . , $N_{si}-1$, and si=0, 1, . . . , $N_s-1$. Following such definitions, the ACI unit 104 is configured to design the ACI as a combination of indices of all primary regions and of indices of all secondary regions such as $(I_0, I_1, \ldots, I_{np-1}, J_0, J_1, \ldots, J_{Ns-1})$, wherein the total available number of possible ACIs are $M_{p0}*M_{p1}* \ldots *M_{Np-1}*M_{s0}*M_{s1}* \ldots *M_{Ns-1}$, which is large enough to avoid PCI conflict and confusion.

In some embodiments, when only one primary region and one secondary region are defined and utilized by the ACI unit 104 of the cell 102, the ACI unit 104 is configured to design the ACI as a combination of two indices ($P_i$, $S_j$), where $P_i$ is the base sequence index transmitted in the primary region, and $S_j$ is the base sequence index transmitted in the secondary region. The table below shows an example of the mapping between the ACI and the combination of indices of the primary region and the secondary region:

| ACI | Primary Sequence index in the Primary Region | Secondary Sequence index in the Secondary Region |
|---|---|---|
| 0 | ... | ... |
| K | i | j |
| ... | ... | ... |

According to table above, the maximum number of ACI's with one primary sequence index and one secondary index is Mp*Ms, where Mp is the total number of primary region sequences, and Ms is the total number of secondary region sequences.

In some embodiments, each secondary region is associated with a certain primary region, where an example of a table associating the secondary region and the corresponding primary region is shown below:

| Secondary Region Index | Primary Region Index |
|---|---|
| 0 | P0 |
| 1 | P1 |
| ... | ... |
| $N_s - 1$ | $P_{Ns-1}$ |

In some embodiments, the ACI unit 104 of the cell 102 is configured not to scramble the base sequences in all of the primary regions during transmissions of the ACI. In some embodiments, the ACI unit 104 is configured to scramble the base sequences in all of the secondary regions during transmissions of the ACI by a scrambling sequence $Z^i_m(q,n)$, where i (secondary region index)=0, 1, ..., $N_s-1$, m (secondary region sequence index)=0, 1, ..., $M_{si}-1$, n (sequence element index)=0, 1, ..., $N_{si}-1$, q (the primary sequence index in the corresponding primary region)= 0, 1, ..., $M_{pi}-1$.

In some embodiments, the ACI unit 104 of the cell 102 is configured to generate the scrambling sequence $Z^i_m(q,n)$ of one or more of the secondary regions based on the base sequence index of the corresponding primary region. For a non-limiting example, if the secondary region i is corresponding to the primary region k and the ACI representation contains the primary sequence index q and its corresponding secondary sequence m, an m-sequence $Q^i_m(q,n)$ is generated with the initial value of the corresponding primary sequence index q in the ACI representation. There are maximum of $M_{si}$ different predefined sequences $Q^i_m(q,n)$, m=0, ..., $M_{si}-1$ in total corresponding to the base sequence index, and $Z^i_m(q,n)=Q^i_m(q,n)$.

In some embodiments, the ACI unit 104 of the cell 102 is configured to generate the scrambling sequence $Z^i_m(q,n)$ of one or more of the secondary regions based on both the base sequence index of the corresponding primary region and the physical cell identity (PCI) of the cell 102 as: $Z^i_m(q,n)=Q^i_m(q,n)*C_{PCI}(n)$, where $C_{PCI}(n)$ is a predefined sequence according to PCI.

In some embodiments, the ACI unit 104 of the cell 102 is configured to reserve a predefined index set in some of the base sequences or in all of the base sequences for facilitating the noise power estimation at the receiver/UE 104 side of the ACI. This means that the base sequence(s) with the predefined index set is never transmitted in the corresponding regions (either primary region or secondary region) in the cell.

Figure 3:
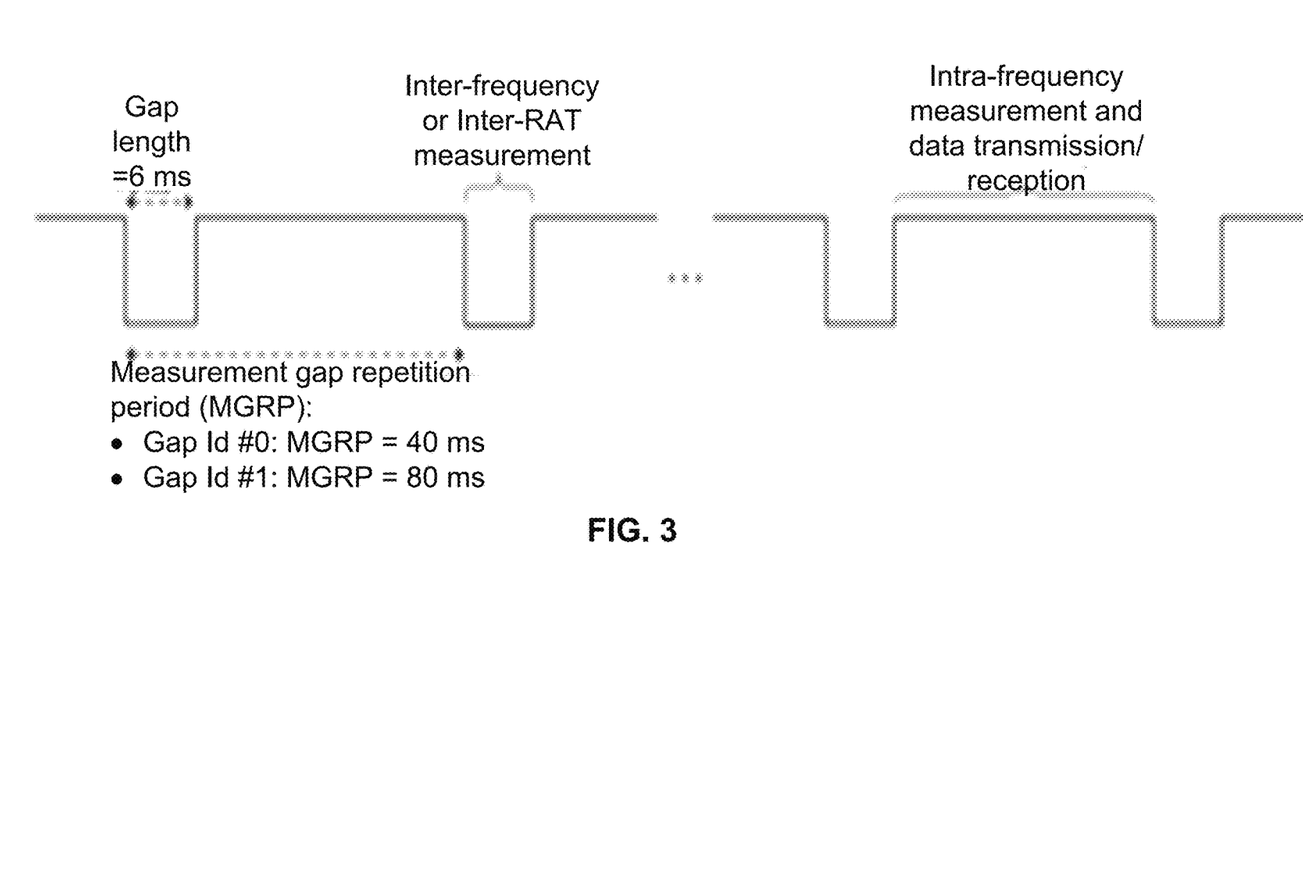
FIG. 3 depicts an example of a pattern for inter-frequency and inter-RAT measurement gap.

In some embodiments, when the ACI unit 104 of the cell 102 transmits the ACI twice in one radio frame, the ACI detector 108 of the UE 106 is configured to detect the ACI independently in each half of the radio frame, which fulfills the requirements of inter-frequency/inter-RAT measurement with a gap as shown by the example of a pattern for inter-frequency and inter-RAT measurement gap depicted in FIG. 3. The difference between the first ACI transmission and the second ACI transmission is that in the second transmission the primary region and secondary region are swapped in frequency domain. In this way, the ACI detector 108 can identify whether the ACI is located in the first half of the radio frame or the second half of the radio frame depending on only one appearance of the ACI.

In some embodiments, the ACI unit 104 of the cell 102 is configured to repeat the transmissions of the ACI in each radio frame, or periodically in a certain pattern. Under such transmission scenario, the ACI can be detected jointly by the ACI detector 108 in one or more radio frames if permitted in order to have a better detection performance.

In some embodiments, the ACI unit 104 of the cell 102 is configured to transmit the ACI in the same layer as a macro base station. Such transmission scenario enables efficient multi-layer-operations by discovering cells 102 in the same layer more quickly so that the ACI can be detected by the handsets/UEs 104 prior to the conventional signalling procedures, such as traditional cell search procedures, to reduce the power consumption of the handsets/UEs 104 significantly.

In some embodiments, the ACI unit 104 of the cell 102 is configured to transmit the ACI in a common layer shared with the UEs 104. Such transmission scenario enables efficient multi-layer-operations by discovering cells in other layers more quickly so that the ACI can be detected by the handsets/UEs 104 without switching to a new band and prior to the conventional signalling procedures, such as traditional cell search procedures, to reduce the power consumption of the handsets/UEs 104 significantly.

In some embodiments, when one layer is organized in a cluster way, cells 102 in one cluster can have the same primary sequence indices which acts as a cluster ID.

In the example of FIG. 1, when the ACI detector 108 of the UE 106 reads only half of one radio frame, meaning that there is only one transmission of the ACI, the ACI detector 108 is configured to detect the cell 102 that transmits the ACI as follows:

First, the ACI detector 108 correlates all locally generated primary region base sequences for all of the primary regions. Such correlation can be done according to the choices of the base sequences. For example, if Hadamard sequences are applied to all base sequence sets, then the ACI detector 108 can perform the correlation via a Hadamard transformation instead.

Then, the ACI detector 108 compares the relative bigger peaks among the primary regions. If the bigger peaks are located at the primary regions of the first ACI transmission in the radio frame, then it means that the first ACI transmission is the first half in the radio frame. Otherwise, the first ACI transmission is the second half in the radio frame.

Once the primary regions are identified, the ACI detector 108 estimates the noise power via the corresponding reserved index set in each of the identified primary regions and combines all of the estimates in the primary regions to obtain the final noise power estimate. The ACI detector 108 further applies certain threshold above the noise power estimate according to a false alarm rate and chooses those correlation output values above the threshold, thus identifying the detected primary sequences set in each primary region.

For each of the secondary regions, the ACI detector 108 uses the scrambling sequences codes identified according to the detected primary sequences set in the corresponding primary region and then performs Multi-user-detection (MUD)-like detection to find the valid secondary sequences set for each of the detected primary sequences in the corresponding primary region. Specifically, if the secondary region j is associated with the primary region i, the detected primary sequence set in the primary region i is $\{d0, d1, \ldots, d_D\}$, and the transmitted secondary sequence set for the primary sequence index di in the secondary region j is $\{s^{di}_0, s^{di}_1, s^{di}_{Edi}\}$, then the received secondary region signal $r^j(n)$ in the secondary region j can be determined by:

$$r^j(n) = \sum_{di=\{d0,d1,\ldots d_D\}} \sum_{m=\{s^{di}_0, s^{di}_1, \ldots s^{di}_{Edi}\}} A^j_m(n) \cdot Z^j_m(di, n) + \text{noise}$$

The task of the MUD-like detection is to find out the set of transmitted secondary sequences for each detected primary sequence according to the equation above.

Finally, the ACI detector 108 identifies all of the ACI numbers transmitted by the ACI unit 104 of the cell 102 according to all of the detected primary and secondary sequence combinations by looking up the ACI mapping table discussed above.

The mechanisms, techniques and concepts discussed herein may be utilized in other applications to provide information other than an ACI. For a non-limiting example, information such as frequency carriers supported by LPN(s) in a Heterogeneous Network or HetNet, or the priority of the frequency carriers, etc., may be provided to enable efficient intra-layer and inter-layer operations, in accordance with various alternative embodiments of the invention.

Figure 4:
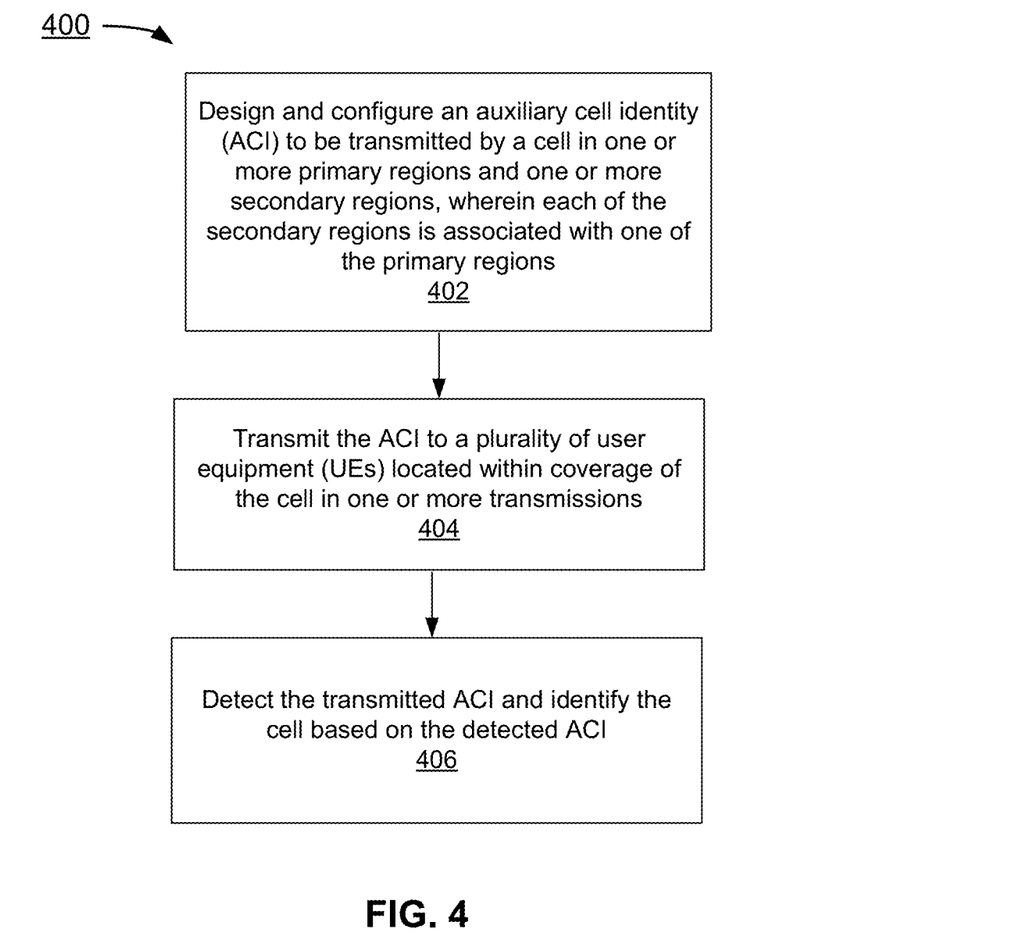
FIG. 4 depicts a flowchart of an example of a process to support auxiliary cell identity transmission and detection in a mobile communication network.

FIG. 4 depicts a flowchart 400 of an example of a process to support auxiliary cell identity transmission and detection in a mobile communication network. Although this figure depicts functional steps in a particular order for purposes of illustration, the process is not limited to any particular order or arrangement of steps. One skilled in the relevant art will appreciate that the various steps portrayed in this figure could be omitted, rearranged, combined and/or adapted in various ways.

In the example of FIG. 4, the flowchart 400 starts at block 402, where an ACI is designed and configured to be transmitted by a cell in one or more primary regions and one or more secondary regions, wherein each of the secondary regions is associated with one of the primary regions. The flowchart 400 continues to block 404, where the ACI is transmitted to a plurality of user equipment (UEs) located within coverage of the cell in one or more transmissions. The flowchart 400 ends at block 406, where the transmitted ACI is detected and the cell is identified based on the detected ACI.

While one or more embodiments of the invention have been described above, it should be understood that they have been presented by way of example only, and not by way of limitation. Likewise, the various figures or diagrams may depict an example that is architectural or another configuration for the disclosure, which is done to aid in understanding the features and functionality that can be included in the disclosure. The disclosure is not restricted to the illustrated example architectures or configurations, but can be implemented using a variety of alternative architectures and configurations.

Additionally, although the invention is described above in terms of various exemplary embodiments and implementations, it should be understood that the various features and functionality described in one or more of the individual embodiments are not limited in their applicability to the particular embodiment with which they are described, but instead can be applied, alone or in some combination, to one or more of the other embodiments of the invention, whether or not such embodiments are described and whether or not such features are presented as being a part of a described embodiment. Thus the breadth and scope of the present invention should not be limited by any of the above-described exemplary embodiments.

One or more of the functions described in this document may be performed by an appropriately configured module. The term "module" as used herein, can refer to hardware, firmware, software and any associated hardware that executes the software, and any combination of these elements for performing the associated functions described herein. Additionally, various modules can be discrete modules; however, as would be apparent to one of ordinary skill in the art, two or more modules may be combined to form a single module that performs the associated functions according various embodiments of the invention.

Additionally, one or more of the functions described in this document may be performed by means of computer program code that is stored in a "computer program product", "non-transitory computer-readable medium", and the like, which is used herein to generally refer to media such as, memory storage devices, or storage unit. These, and other forms of computer-readable media, may be involved in storing one or more instructions for use by processor to cause the processor to perform specified operations. Such instructions, generally referred to as "computer program code" (which may be grouped in the form of computer programs or other groupings), which when executed, enable the computing system to perform the desired operations.

It will be appreciated that, for clarity purposes, the above description has described embodiments of the invention with reference to different functional units and/or processors. However, it will be apparent that any suitable distribution of functionality between different functional units, processors or domains may be used without detracting from the invention. For example, functionality illustrated to be performed by separate units, processors or controllers may be performed by the same unit, processor or controller. Hence, references to specific functional units are only to be seen as references to suitable means for providing the described functionality, rather than indicative of a strict logical or physical structure or organization required by the invention.

What is claimed is:

1. A system to support auxiliary cell identity (ACI) transmission and detection in a mobile communication network, comprising:
   an ACI unit in a cell, which in operation, is configured to:
      design and configure an ACI to be transmitted in one or more primary regions and one or more secondary regions, wherein each of the secondary regions is associated with one of the primary regions;

transmit the ACI to a plurality of user equipment (UEs) located within coverage of the cell in one or more transmissions;

an ACI detector in each of said UEs, which in operation, is configured to detect the transmitted ACI and identify the cell based on the detected ACI.

2. The system of claim 1, wherein:
the mobile communication network is an LTE network.

3. The system of claim 1, wherein:
the cell is one of a macro base station, a high transmit power base station, a low transmit power node (LPN), and another base station operable to transmit its cell identity to the UEs in a multi-layered network for identification and connection.

4. The system of claim 1, wherein:
the ACI unit is configured to transmit the ACI together with a physical cell identity (PCI) of the cell.

5. The system of claim 4, wherein:
the ACI is utilized either as an independent cell identity by itself or as a supplemental cell identity to the PCI for identification of the cell.

6. The system of claim 1, wherein:
the ACI unit is configured to map the primary region and the secondary region into unused resource elements (REs) besides primary and secondary synchronization channels in the mobile communication network when only one primary region and one secondary region are present during the transmissions of the ACI.

7. The system of claim 1, wherein:
the ACI unit is configured to adjust configurations and definitions of the primary regions and/or the secondary regions dynamically prior to the transmissions of the ACI.

8. The system of claim 1, wherein:
the ACI unit is configured to define a set of base sequences including a plurality of orthogonal sequences for each of the primary regions and the secondary regions.

9. The system of claim 8, wherein:
the ACI unit is configured to configure the ACI as a combination of indices of the base sequences of all of the primary regions and of all of the secondary regions.

10. The system of claim 8, wherein:
the ACI unit is configured not to scramble the base sequences in the primary regions during transmissions of the ACI.

11. The system of claim 8, wherein:
the ACI unit is configured to scramble the base sequences in the secondary regions by a scrambling sequence during transmissions of the ACI.

12. The system of claim 11, wherein:
the ACI unit is configured to generate the scrambling sequence of the secondary regions based on the base sequence index of the corresponding primary region.

13. The system of claim 12, wherein:
the ACI unit is configured to generate the scrambling sequence of the secondary regions based on both the base sequence index of the corresponding primary region and physical cell identity (PCI) of the cell.

14. The system of claim 8, wherein:
the ACI unit is configured to reserve a predefined index set in some of the base sequences to facilitate noise power estimation at the UE.

15. The system of claim 1, wherein:
the ACI unit is configured to transmit the ACI twice in one radio frame, wherein the first transmission is via a first primary region and a first secondary region, and the second transmission is via a second primary region and a second secondary region.

16. The system of claim 15, wherein:
The ACI detector is configured to detect the ACI independently in each half of the radio frame when the ACI unit transmits the ACI twice in the one radio frame.

17. The system of claim 15, wherein:
the ACI unit is configured to repeat the transmissions of the ACI in the radio frame or periodically in a certain pattern.

18. The system of claim 1, wherein:
the ACI unit is configured to transmit the ACI in the same layer as a macro base station.

19. The system of claim 1, wherein:
the ACI unit is configured to transmit the ACI in a common layer shared with the UEs.

20. A method to support auxiliary cell identity (ACI) transmission and detection in a mobile communication network, comprising:

designing and configuring an ACI to be transmitted by a cell in one or more primary regions and one or more secondary regions, wherein each of the secondary regions is associated with one of the primary regions;

transmitting the ACI to a plurality of user equipment (UEs) located within coverage of the cell in one or more transmissions;

detecting the transmitted ACI and identifying the cell, at the UEs, based on the detected ACI.

21. The method of claim 20, further comprising:
transmitting the ACI together with a physical cell identity (PCI) of the cell.

22. The method of claim 21, further comprising:
utilizing the ACI either as an independent cell identity by itself or as a supplemental cell identity to the PCI for identification of the cell.

23. The method of claim 20, further comprising:
mapping the primary region and the secondary region into unused resource elements (REs) besides primary and secondary synchronization channels in the mobile communication network when only one primary region and one secondary region are present during the transmissions of the ACI.

24. The method of claim 20, further comprising:
adjusting configurations and definitions of the primary regions and/or the secondary regions dynamically prior to the transmissions of the ACI.

25. The method of claim 20, further comprising:
defining a set of base sequences including a plurality of orthogonal sequences for each of the primary regions and the secondary regions.

26. The method of claim 25, further comprising:
configuring the ACI as a combination of indices of the base sequences of all of the primary regions and of all of the secondary regions.

27. The method of claim 25, further comprising:
not scrambling the base sequences in the primary regions during transmissions of the ACI.

28. The method of claim 25, further comprising:
scrambling the base sequences in the secondary regions by a scrambling sequence during transmissions of the ACI.

29. The method of claim 28, further comprising:
generating the scrambling sequence of the secondary regions based on the base sequence index of the corresponding primary region.

30. The method of claim 29, further comprising:
generating the scrambling sequence of the secondary regions based on both the base sequence index of the corresponding primary region and physical cell identity (PCI) of the cell.

31. The method of claim 25, further comprising:
reserving a predefined index set in some of the base sequences to facilitate noise power estimation at the UE.

32. The method of claim 20, further comprising:
transmitting the ACI twice in one radio frame, wherein the first transmission is via a first primary region and a first secondary region, and the second transmission is via a second primary region and a second secondary region.

33. The method of claim 32, further comprising:
detecting the ACI independently in each half of the radio frame when the ACI is transmitted twice in the one radio frame.

34. The method of claim 32, further comprising:
repeating the transmissions of the ACI in the radio frame or periodically in a certain pattern.

35. The method of claim 20, further comprising:
transmitting the ACI in the same layer as a macro base station.

36. The method of claim 20, further comprising:
transmitting the ACI in a common layer shared with the UEs.

* * * * *